(12) United States Patent
Schwarz

(10) Patent No.: US 6,598,665 B2
(45) Date of Patent: Jul. 29, 2003

(54) CLIMATE CONTROL FOR VEHICLE

(75) Inventor: Stefan Schwarz, Rochester Hills, MI (US)

(73) Assignee: Valeo Climate Control, Inc., Auburn Hills, MI (US)

( * ) Notice: Subject to any disclaimer, the term of this patent is extended or adjusted under 35 U.S.C. 154(b) by 39 days.

(21) Appl. No.: 09/282,599

(22) Filed: Mar. 31, 1999

(65) Prior Publication Data

US 2002/0007944 A1 Jan. 24, 2002

(51) Int. Cl.$^7$ .......................... F25B 29/00; B60H 1/00; B60H 1/10; B60H 3/00; F24F 13/02
(52) U.S. Cl. ..................... 165/42; 165/203; 165/43; 237/12.3 A; 237/12.3 B; 454/156; 454/160; 454/161; 454/137; 62/244
(58) Field of Search ................... 165/202, 203, 165/42, 43; 237/12.3 A, 12.3 B; 454/156, 137, 160, 161; 62/244

(56) References Cited

U.S. PATENT DOCUMENTS

| | | | | |
|---|---|---|---|---|
| 3,127,931 A | * | 4/1964 | Johnson | 454/907 |
| 4,289,195 A | * | 9/1981 | Bellot et al. | 165/204 |
| 4,470,270 A | * | 9/1984 | Takada et al. | 62/244 |
| 4,473,109 A | * | 9/1984 | Kojima et al. | 62/244 |
| 4,658,888 A | * | 4/1987 | Sakurai et al. | 165/203 |
| 4,842,047 A | * | 6/1989 | Sakurada et al. | 165/43 |
| 4,901,788 A | * | 2/1990 | Doi | 165/204 |
| 4,949,779 A | * | 8/1990 | Kenny et al. | 165/43 |
| 5,526,650 A | * | 6/1996 | Iritani et al. | 62/90 |
| 5,619,862 A | * | 4/1997 | Ruger et al. | 165/202 |

FOREIGN PATENT DOCUMENTS

| | | | | |
|---|---|---|---|---|
| FR | 2400161 | * | 4/1979 | 165/42 |
| GB | 1246803 | * | 9/1971 | 165/43 |
| JP | 58-136813 | * | 9/1983 | |
| JP | 60-8105 | * | 1/1985 | |
| JP | 6-115345 | * | 4/1994 | |
| JP | 10-329535 | * | 12/1998 | |

* cited by examiner

Primary Examiner—John K. Ford
(74) Attorney, Agent, or Firm—Morgan & Finnegan, LLP

(57) ABSTRACT

A system for supplying air to first and second regions of a vehicle passenger compartment, has a first fan, a heater device, and first and second air conduits. The heater device has a first air inlet and outlet for air from the first fan and a second air inlet and outlet for recirculating air within the passenger compartment. The first and second outlets of the heater device supply air through the first and second air conduits to the first and second regions of the said vehicle. The second air conduit is connected to said second air outlet of said heater device via a second fan operable in use to selectively supply air through the second conduit to the second region of the vehicle.

2 Claims, 4 Drawing Sheets

CLIMATE CONTROL FOR VEHICLE

FIELD OF THE INVENTION

The present invention relates generally to the delivery of air within vehicles and more particularly but not exclusively to a system capable of delivering heated or cooled air at different temperatures to different regions of a vehicle

BACKGROUND OF THE INVENTION

Vehicle air-conditioning systems are well-known in the art. They usually take the form of a combined heating and cooling system, which can draw air in from outside at the front of the vehicle and re-circulate air from inside the vehicle. Heating is performed by a heat exchanger using engine heat, and cooling by an evaporator which is part of a refrigeration system. The air is moved through the system by a fan or blower, the speed of which may be varied, and is output into the vehicle interior through one or more nozzles or other openings at the front of the passenger compartment. Air blend controls are operable by the vehicle occupants, or by an automatic control system to vary the interior temperature of the vehicle. Similar heating systems are known in which no evaporator is present.

Known systems have the drawback of being unable to maintain a suitable temperature throughout the entire interior vehicle space. For example, it is common for the occupants in the front of the vehicle to feel warm but for the occupants in the rear of the vehicle to be too cold because the warm air is sent only into the front of the vehicle and therefore the majority of it has cooled before it reaches the occupants in the rear of the vehicle. Similarly, if a temperature below ambient is chosen by the front-seat occupants, often the rear of the vehicle will not be sufficiently cooled and will therefore be uncomfortable for its occupants.

It is desirable to provide a heating, cooling, or air-conditioning system for a vehicle which can distribute air to several parts of the vehicle to provide a comfortable environment for all occupants. This is especially important in multi-purpose and sports-utility vehicles having at least two rows of rear-seat passengers.

Although it would be possible to modify known systems by merely providing additional ducting to the rear of the vehicle, this would not overcome the problem. A major need, that for increased temperature at the foot level of rear seat passengers, would not be met by merely providing additional outlets to the rear, because the front occupants would have to endure too high temperatures. Secondly, the length of additional ducting would undesirably throttle the fan output at the rear outlets, and to overcome this with sufficient air flow to the rear would inevitably lead to too much air flow in the front. There is thus a need for additional measures.

Furthermore, since many air-conditioning systems distribute air at only one temperature at any one time, it is common for the occupants' feet and bodies to be warm, whilst the area at head level tends to become stuffy and uncomfortably hot. Conversely, if the temperature is set to be cool enough to be comfortable at head level, the occupants soon begin to feel cold, particularly at floor level. It is known that comfort is best achieved when warm air is delivered around the floor area, with a supply of cooler air at head level.

It is therefore an object of the present invention to at least partly mitigate the problems of the prior art.

It is an object of certain embodiments of the invention to provide separately controllable temperatures or air flows in different regions of a vehicle interior.

SUMMARY OF THE INVENTION

According to a first aspect of the invention there is provided a system for supplying air to first and second regions of a vehicle passenger compartment, comprising a first fan, a heater device, and first and second air conduits, said heater device having an air inlet and first and second air outlets, said first fan having an inlet for drawing air into the system and a fan outlet, said fan outlet being coupled to said inlet of said heater device to supply air thereto, said first and second outlets of the said heater device being coupled to said first and second air conduits for supply thereby of air to said first and second regions of the said vehicle wherein said second air conduit is connected to said second air outlet of said heater device via a second fan operable in use to selectively supply air through said second conduit to said second region of the said vehicle.

Preferably the system further comprises an air duct, said air duct housing an evaporator and a blend control device, and said air duct defining a mixing chamber and a bypass conduit, said evaporator having an evaporator inlet and an evaporator outlet for air cooled by said evaporator, said evaporator inlet being coupled to said fan outlet of said first fan, said evaporator outlet being coupled to said mixing chamber via said bypass conduit, and being coupled to said heater device inlet, said heater device first outlet being coupled to said mixing chamber to supply air heated by said heater device to said mixing chamber, said blend control device being disposed at the evaporator outlet for controllably obturating said bypass conduit and at least a portion of said heater device inlet to control thereby the temperature of air in said mixing chamber.

In a second aspect the invention comprising a system for supplying air to first and second regions of a vehicle passenger compartment, comprising first and second fans, a heater device, and first and second air conduits, said heater device having an air inlet and first and second air outlets, said first fan having an inlet for drawing air into the system and a fan outlet, said fan outlet being coupled to said inlet of said heater device to supply air thereto, said first and second outlets of the said heater device being coupled to said first and second air conduits for supply thereby of air to said first and second regions of the said vehicle, said second fan having an inlet and an outlet, said outlet of the said second fan being coupled to the second conduit and said inlet of the said second fan being coupled to the said second outlet of the said heater device whereby the said second fan is operable in use to selectively supply air through said second conduit to said second region of the said vehicle, the system further having a further air inlet connected to the fan inlet of the said second fan, whereby air from outside the system may be inlet to said fan inlet of the said second fan.

Preferably the system further comprises an inlet conduit connecting said inlet of the said second fan to said second outlet of the said heater device, said inlet conduit defining said further air inlet between said heater device and said second fan.

Advantageously the inlet conduit has valve means for selectively opening said further air inlet.

Conveniently said valve means is operable to variably select between air from the said heater device and said air from outside.

In a further aspect, the invention provides a vehicle having a passenger compartment, said passenger compartment having at least first and second regions, and a system for supplying air to said first and second regions, the system comprising first and second fans, a heater device, and first and second air conduits, said heater device having an air inlet and first and second air outlets, said first fan having an inlet for drawing air into the system and a fan outlet, said fan outlet being coupled to said inlet of said heater device to supply air thereto, said first and second outlets of the said heater device being coupled to said first and second air conduits for supply thereby of air to said first and second regions of the said vehicle, said second air conduit being connected to said second air outlet of the said heater device via said second fan, whereby the said second fan is operable in use to selectively supply air through said second conduit to said second region of the said vehicle, wherein said inlet of the said first fan is selectively provided by first and second air intakes, said first air intake being disposed outside said passenger compartment whereby air is drawn in from outside said vehicle and said second air intake being disposed within said passenger compartment whereby air may be recirculated.

In yet a further aspect there is provided a vehicle having a passenger compartment, said passenger compartment having at least first and second regions, and a system for supplying air to said first and second regions, comprising first and second fans, a heater device, and first and second air conduits, said heater device having an air inlet and first and second air outlets, said first fan having an inlet for drawing air into the system and a fan outlet, said fan outlet being coupled to said inlet of said heater device to supply air thereto, said first and second outlets of the said heater device being coupled to said first and second air conduits for supply thereby of air to said first and second regions of the said vehicle, said second fan having an inlet and an outlet, said outlet of the said second fan being coupled to the second conduit and said inlet of the said second fan being coupled to the said second outlet of the said heater device whereby the said second fan is operable in use to selectively supply air through said second conduit to said second region of the said vehicle, the system further having a further air inlet disposed within said passenger compartment, said further air inlet being connected to the fan inlet of the said second fan, whereby air from said passenger compartment may be recirculated by the said second fan.

Preferably said second region is a rear region and said first region is a front region of the passenger compartment.

In yet another aspect, the invention comprises a vehicle having a passenger compartment, and an air conditioning system for delivering air into said compartment, said vehicle further comprising an auxiliary air conditioning system, said auxiliary air conditioning system having an air inlet, an evaporator, a fan and an air outlet, said air inlet being disposed to draw air in from the interior of said passenger compartment under the action of said fan, and said air outlet being disposed to supply air cooled by said evaporator to a head region of said passenger compartment.

In a further aspect there is provided a vehicle having a passenger compartment and an air conditioning installation, the passenger compartment having a front seat region and a rear seat region, the air conditioning installation having first outlets in the front seat region and second outlets in the rear seat region, wherein a first control device is provided for providing a desired temperature in the front seat region, and a second control device is provided for providing a desired temperature in the rear seat region.

BRIEF DESCRIPTION OF THE DRAWINGS

The present invention will now be described by way of example with reference to the accompanying drawings in which.

DESCRIPTION OF THE PREFERRED EMBODIMENTS

Figure 1:
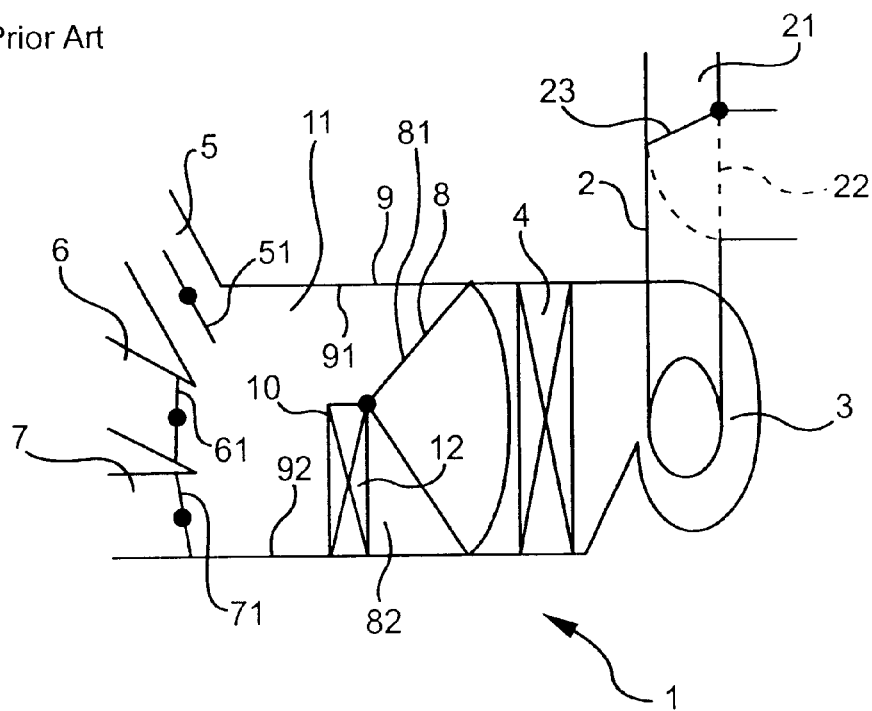
FIG. 1 shows a schematic view of a vehicle air conditioning system in accordance with the prior art

In the figures like reference numerals indicate like parts. Referring to FIG. 1 a vehicle air-conditioning system incorporating a heating and cooling system, is indicated generally by 1. An air delivery duct 2 in a vehicle has two inlets 21 and 22. First inlet 21 leads from the outside of the vehicle and second inlet 22 from the vehicle interior. An inlet door 23 is moveably disposed in the delivery duct 2 with respect to the inlets to select either air from inside, air from outside or a proportion of each for inlet to the duct 2. The inlet door is rigid and is hinged on one wall of the delivery duct 2 to be moveable between one extreme where it closes off the first air inlet 21 and a second extreme where it closes off the second inlet 22. At intermediate positions both inlets are open to a greater or lesser extent.

A fan or blower 3 is disposed at the downstream end of the delivery duct 2 for moving air through the system. Further downstream of the fan 3 is an air duct 9 hereinafter referred to as a main duct 9, which houses an evaporator 4 at an upstream end thereof for cooling the air. Beyond the evaporator 4 the main duct splits into two generally parallel portions 81,82, one of which is defined by the main duct to form a bypass conduit 81 which leads directly to a mixing chamber 11. The other portion 82 houses a heater device, here an engine coolant heat exchanger matrix 10. The heater matrix 10 has an air inlet 12 for receiving air from the evaporator through portion 82 and an outlet opening into the mixing chamber 11. A blend door 8 is disposed across the main duct, and is pivoted to allow control of the proportions of air flow through the bypass conduit 81 and the heater matrix 10. The mixing chamber 11 connects to three outflow ducts 5,6,7 which are disposed around the dashboard of the vehicle, as a first region of the vehicle passenger compartment. The outflow ducts contain moveable gates 51, 61 and 71 respectively for control of the air through each of the ducts In operation, air is drawn into the delivery duct 2 by the fan or blower 3 from outside the vehicle at the first inlet 21 and from inside the vehicle at the second inlet 22. Recirculation of air within the vehicle may be desirable in heavy traffic, or to achieve rapid changes of interior temperature.

The air flow from the delivery duct 2 is passed through the evaporator 4 for cooling, and then to the blend door 8. According to the setting of the blend door, some air will flow direct to the mixing chamber 11 and some will pass to the heater matrix inlet, through the heater matrix 10 for heating and via the heater matrix outlet into the mixing chamber. The cool and heated air flows mix in the mixing chamber as is known in the art, and then passes out into the passenger compartment via the outflow ducts. Usually the outflow ducts are disposed to distribute air at the windscreen, at body level and at floor level. The occupant can choose between the locations at which the air enters the passenger compartment by a selector (not shown) which opens or shuts gates 51, 61 and 71. Either a single location can be chosen, in which case two of the gates are shut and one is fully open, or a combination of two locations can be chosen in which case one of the gates is shut and the other two are partially open.

Figure 2:
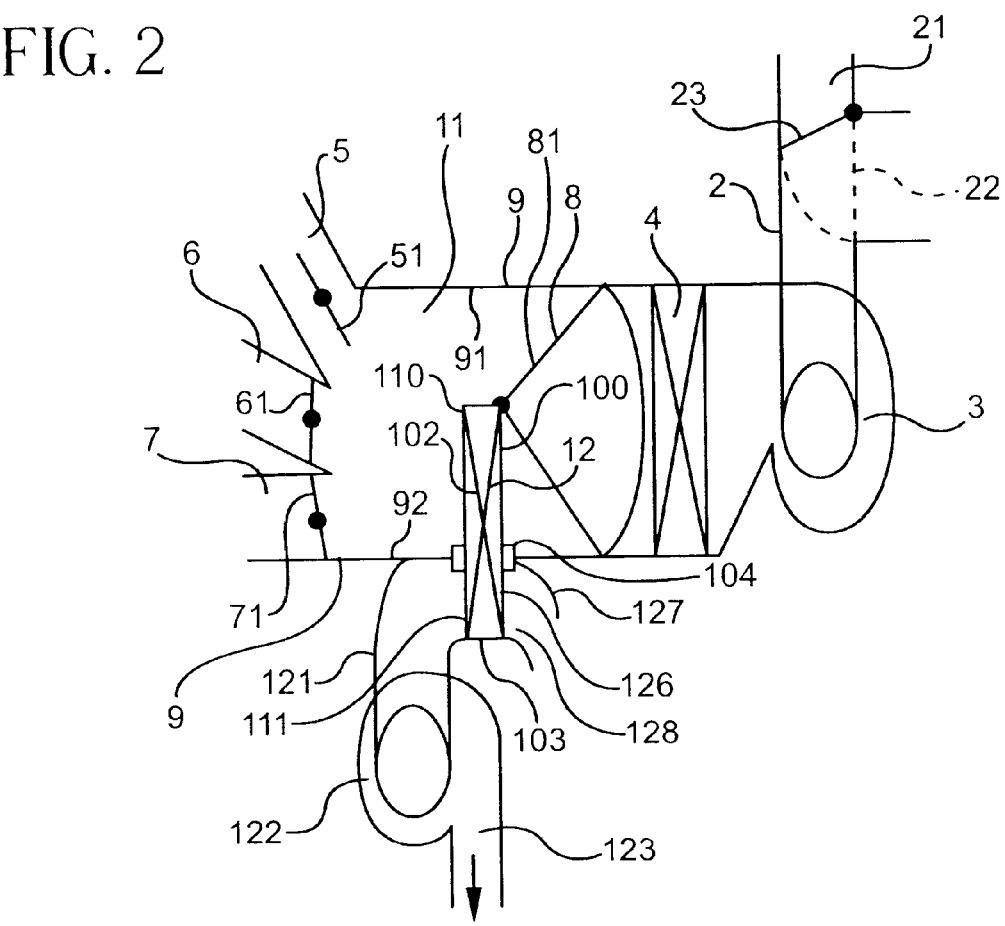
FIG. 2 shows a vehicle air conditioning system in accordance with a first embodiment of the present invention

Referring now to FIG. 2, in the first embodiment of the invention there is provided a second air conduit 123 for supplying air to a second region of the vehicle passenger compartment, here the rear seat region. A second fan 122 is provided for pushing air through the second air conduit 123. The heater matrix 100 of this embodiment differs from that of the prior art by having a first portion disposed within the main duct, to define a first inlet 12 and a first outlet 110, and a second portion disposed in an auxiliary duct 127 for defining a second inlet 126 and a second outlet 110. The disposition of the matrix is such that air flow at the first inlet 12 passes only to the first outlet 110 and air flow at the second inlet passes only to the second outlet 111. The auxiliary duct 127 has an inlet 128 leading from the vehicle passenger compartment, so as to be capable of ingesting air from the passenger compartment for recirculation. The second fan 122 has an inlet coupled via an inlet conduit 121 to the second outlet 111 of the heater matrix 100 so that in use heated air can be supplied to the rear seat region.

In this embodiment the heater matrix 100 is a single matrix Air flow can occur from the outlet of the evaporator via the first inlet 12 to the first outlet 110. Air can additionally or alternatively flow via duct 127 and the inlet 126 to the second outlet 111. Air flow from the main duct to the auxiliary duct 127 is prevented by a seal 104. Thus, in use, coolant from the engine flows through the entire matrix on one circuit, but the air for the heating system is separated into first and second channels 102, 103 by the seal 104. It will be understood by those skilled in the art that if desired, two separate matrices could be provided; other alternatives include electric or gas heaters.

In operation, heated air from the first outlet 110 passes into the mixing chamber 11, and then exits into the passenger compartment as in the prior art. Air from within the passenger compartment is drawn into the auxiliary duct 127 via inlet 128, and passed through the relevant portion of the heater matrix. Heated air from the second outlet 111 is drawn through the inlet conduit 121, by the second fan 122, which propels the heated air through the second air conduit 123 and out into the rear of the vehicle. Hence, the rear of the vehicle has a supply of warm air which can be delivered at a different temperature from that of the air-conditioned air which flows out to the front of the vehicle at locations 5,6 & 7, and furthermore, which flows directly to the required location. The outlet from the second air conduit is near or at floor level, to achieve the desired comfort. Other arrangements are of course possible.

Figure 3:
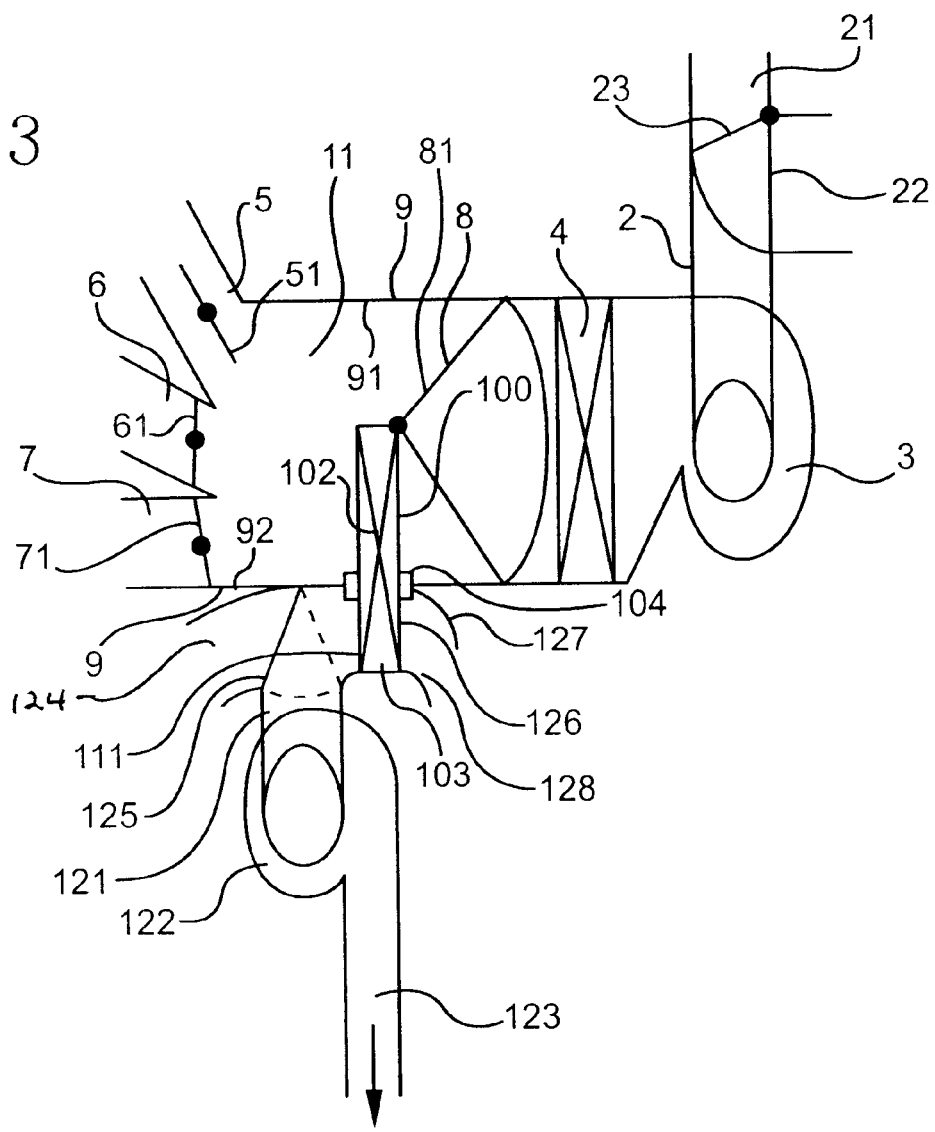
FIG. 3 shows a vehicle air conditioning system in accordance with a second embodiment of the present invention

Referring to FIG. 3, the second embodiment is substantially similar to the first, save for provision of a further air inlet 124.

The further air inlet 124 connects the interior of the passenger compartment to the inlet conduit 121, and is controllable by a control valve, implemented as a blend door 125. The blend door is, in known fashion, pivotally mounted to be capable of rotation between a first position in which it closes the further air inlet 124, and a second position in which it closes the second channel 103 of the heater matrix. Controls allow the blend door to be positioned at the extremes or at various intermediate positions.

In operation, with the blend door 125 at the first position, no air is drawn in through the inlet duct 124 thus providing air to the second fan 122 from the second channel 103 of the heater matrix 100. In the second position, air is only drawn in through further inlet 124. At intermediate positions, varying proportions of air are supplied from the heater matrix and the further inlet 124.

Operation of the second fan propels air at the fan inlet into the second air conduit. By control of the position of the blend door 105 and the fan, further control of temperature and temperature distribution can be effected.

Figure 4:
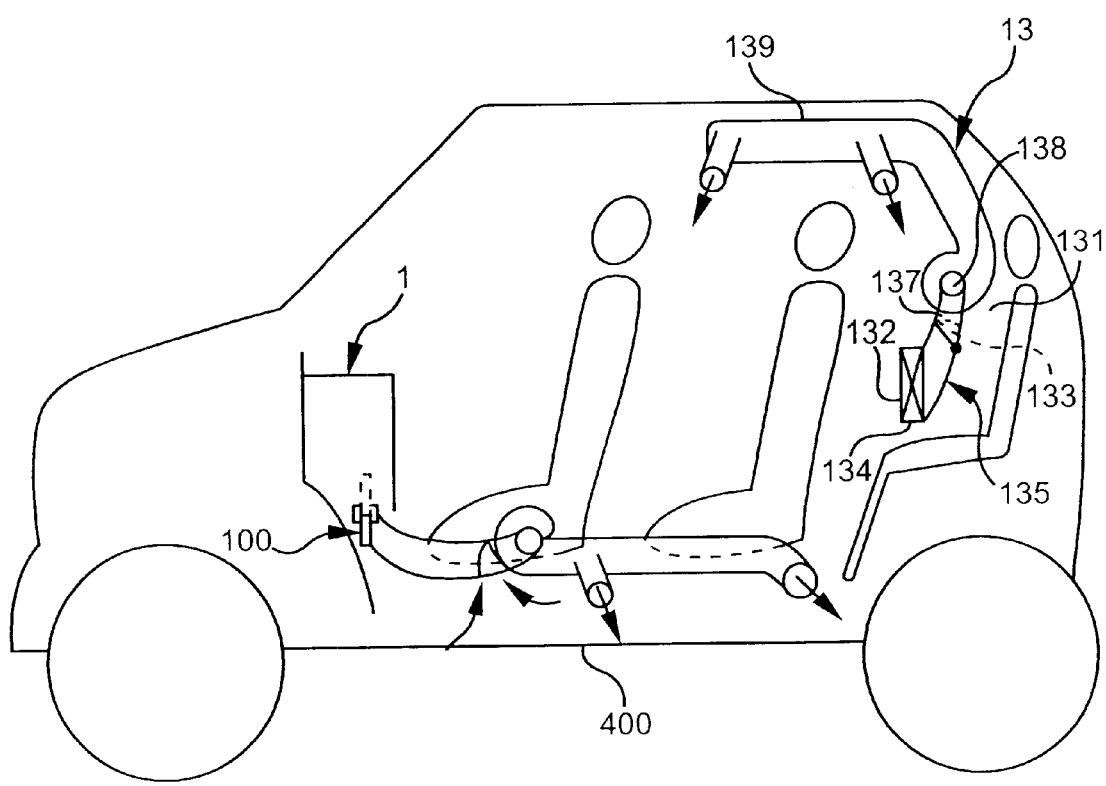
FIG. 4 shows an air-conditioning system in accordance with a third embodiment of the present invention and illustrates the distribution of air into a vehicle from that system.

Referring now to FIG. 4, a third embodiment of the present invention is shown applied to a vehicle with a row of front seats and two rows of rear seats, one behind the other. As seen, the vehicle has a heating system 400 which has outlets to the front and rear of the vehicle at foot level. The heating system 400 may be an air conditioning system in accordance with the prior art, or such a system in accordance with the first or second embodiments of this invention. Alternatively, other heating or cooling systems may be used.

In the third embodiment, an auxiliary air conditioning system 13 is provided for providing cool air flow to the roof region of the vehicle.

The auxiliary air conditioning system has a duct system containing an auxiliary system evaporator 134 and an auxiliary system fan 138 disposed in the duct for moving air through the duct. The duct system has an intake duct 131, and an outlet duct 139, the inlet duct having a first air inlet 132 and a second air inlet 133, each opening into the passenger compartment for taking air therefrom. The first air inlet 132 connects to the inlet of the evaporator 134, and the second connecting to the output of the evaporator. The outlet duct 139 has plural outlets 140 near to roof level of the vehicle passenger compartment, as shown here one between the front and first row of rear seats, and one between the first and second rows of rear seats.

An auxiliary system blend door 135 is disposed adjacent the second inlet 133 to control the proportions of air in the duct respectively entering via the first inlet and passing through the evaporator, and that entering directly through the second inlet. As known in the art, it is pivotally mounted to be movable between a first position where it closes the air flow from the evaporator and opens the second inlet 133, and a second position where it closes the second air inlet 133 and permits flow through the evaporator. The blend door can be set to a number of intermediate positions where different proportions of air input via the evaporator, and thus cooled, and air input directly from the passenger compartment via second inlet 133 are admitted into the duct system.

In operation, the blend door 135 is set to a desired position, for example a midway position where air in drawn in by the fan 138 from both the second air inlet 133 and via the evaporator 134 from the first air inlet 132. As the evaporator cools the air passing through it, the temperature in the duct system is lower than that in the passenger compartment. As noted above, the outlet duct 139 has air outlets at suitable locations for the three rows of passengers. In this way all the occupants are provided with air movement at head level and this air can be cooled if required, its temperature being determined by the position of blend door 135.

Having devised a system capable of providing both warmed and cooled air to the rear of a vehicle, it is desirable to provide suitable controls accessible to the rear passengers for setting the air temperature.

Figure 5:
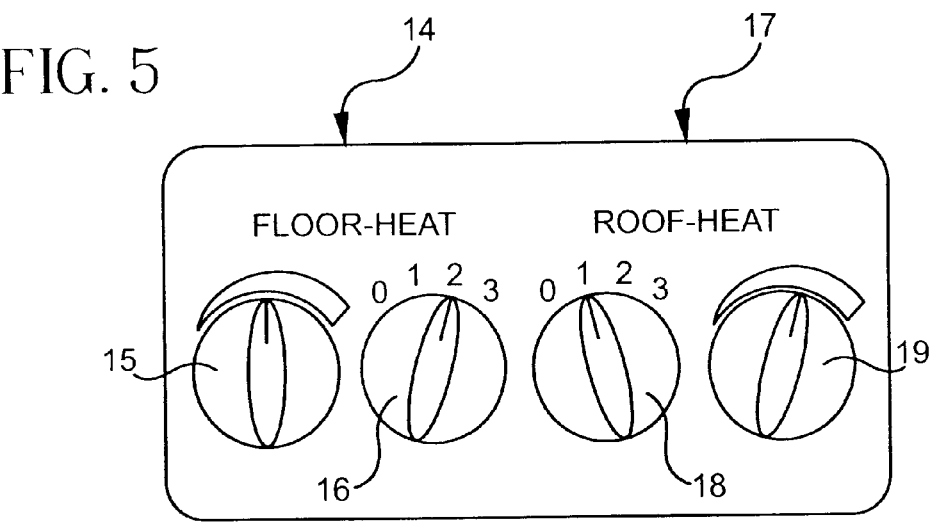
FIG. 5 shows one possible configuration of control of the air-conditioning system of FIG. 4.

A first control device for the rear seat portion of a combined air-conditioning system of the third embodiment of the invention is shown in FIG. 5.

Referring to FIG. 5, two pairs of rotary controls are disposed side by side. A first pair 14 allows selection of the floor temperature and a second pair 17 allows selection of the roof temperature.

The first pair 14 comprises a temperature control 15 and a fan or blower speed control 16. In use, the temperature controller is connected, for example by Bowden cable to the blend door 125 of the floor heating portion of the main air conditioning system to vary the position of door 125, in order to vary the relative proportions of heated and recirculated air being drawn into the inlet conduit 121. The blower speed control is in use connected to a suitable switching circuit for setting the speed of the second fan 122.

The second pair of controllers is similar to the first, and comprises a temperature control 19 and a fan speed control 18. As with the first pair 14, the temperature control is connected to vary the proportions of ambient air and cooled air drawn, this time into inlet duct 131, and the fan speed control operates on the auxiliary system fan 138.

Figure 6:
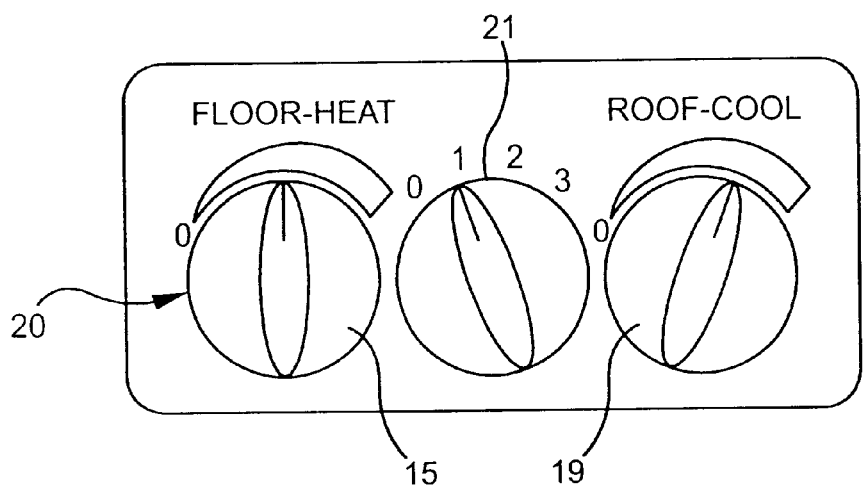
FIG. 6 shows another possible configuration of control of the air-conditioning system of FIG. 4.

Another control device for operating the air-conditioning system of the third embodiment shown in FIG. 6, has a set of three rotary controls 20 for selecting the floor and the roof temperatures. A single speed control 21 is provided, and this is connected in use to simultaneously vary the speed of fans 122 and 134. Two rotary temperature controls are provided for floor and roof temperature, connected as previously described with reference to FIG. 5.

Figure 7:
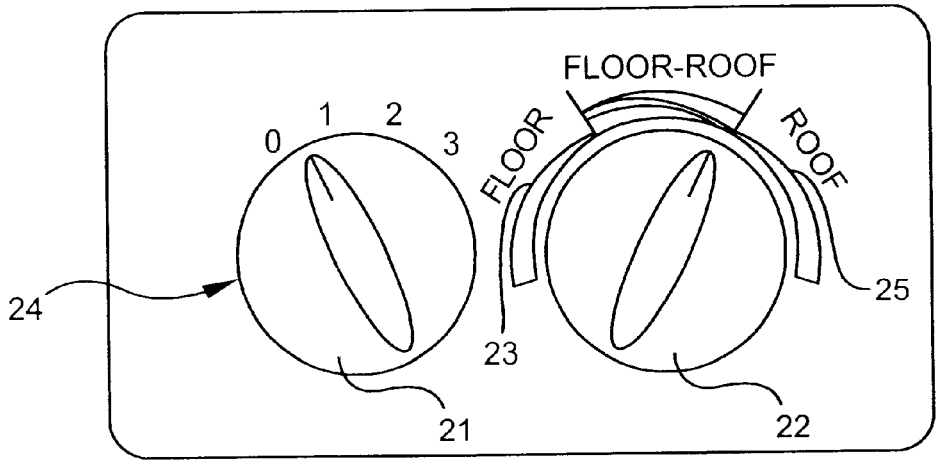
FIG. 7 shows yet another possible configuration of control of the air-conditioning system of FIG. 4.

Yet another control device for operating the rear air-conditioning system of the third embodiment shown in FIG. 7, has one pair of rotary controls indicated generally at 24 for operating the floor and the roof systems. This option comprises the above-mentioned single speed control 21, but in this case the heating functions for the floor and roof are combined on one rotary control 22 which varies the positions of blend doors 125 and 135 simultaneously or sequentially. The control has three contiguous rotational zones 23, 24, 25. Zone 23 is for controlling the temperature of the floor only, zone 24 is for controlling the temperature of the roof and the floor and zone 25 is for controlling the temperature of the roof only. At the clockwise extreme of the rotation, the pointer is directed to the first zone 23, and the control indicates that the floor is hot. The effect of this setting is that all of the air which passes blend door 125 has come from the heater matrix and none of the air which passes blend door 135 has been through evaporator 134. As the control is turned anti-clockwise within zone 23 the temperature of air supplied to the floor is reduced until at the start of zone 24, while heated air continues to be supplied to the floor, some cooled air is supplied to the roof. As the control continues to rotate anti-clockwise, the temperature of air supplied to the floor continues to decline and the temperature of cool air supplied to the roof is lowered at the same time. At the anti-clockwise extreme of zone 24, the air supplied to the floor ceases to be warmed. The temperature of cooled air supplied to the roof continues to fall through zone 25 until it reaches a maximum at the anti-clockwise extreme of zone 25.

It will be appreciated by those skilled in the art that any of the rotary controls of FIGS. 5–7 could be replaced by linear controls.

The invention has now been described with reference to a number of preferred embodiments. It will be understood that the invention is not limited to the described embodiments but extends to the full scope of the appended claims.

What is claimed is:

1. A vehicle, comprising:

a passenger compartment having at least a first and a second region; a heater device having, a primary air circuit, said primary air circuit having a first and second air inlets and first and second air outlets, air at the first inlet may pass substantially only to the first outlet and air at the second inlet may pass substantially only to the second outlet, said primary air circuit further including an evaporator such that air flow through the primary circuit crosses said evaporator;

a first fan having an air inlet and a fan outlet, said fan outlet being coupled to said first inlet of said heater device for supplying air thereto, a secondary air circuit having an auxiliary inlet duct and an auxiliary inlet, air flow in said inlet duct impeded from fluid communication with air flow of said first and second inlets of said primary air circuit such that said auxiliary inlet duct is disposed to receive air from within said passenger compartment for recirculation of air in said passenger compartment so that air flow through said secondary air circuit does not cross said evaporator;

first and second air conduits coupled to first and second outlets of the heater device for supplying air to said first and second regions of the vehicle;

a second fan having an inlet and an outlet, said outlet of the second fan being coupled to the second conduit and said inlet of the second fan being coupled to the second outlet of the heater device whereby the second fan is operable in use to selectively supply air through said second conduit to said second region of the vehicle; and said auxiliary inlet disposed within said passenger compartment, said auxiliary inlet being connected to the fan inlet of the second fan, whereby air from said passenger compartment may be recirculated by the second fan.

2. The vehicle according to claim 1, wherein said second region is a rear region and said first region is a front region of the passenger compartment.

* * * * *